US008370267B2

(12) United States Patent
Carey et al.

(10) Patent No.: US 8,370,267 B2
(45) Date of Patent: Feb. 5, 2013

(54) SYSTEM AND METHOD FOR APPRAISER-ASSISTED VALUATION

(75) Inventors: William Carey, Naples, FL (US); Timothy McParland, Novelty, OH (US)

(73) Assignees: Carey Mead Consultants, Inc., Naples, FL (US); Dwellworks Residential Services, LLC, Warrensville Heights, OH (US)

( * ) Notice: Subject to any disclaimer, the term of this patent is extended or adjusted under 35 U.S.C. 154(b) by 616 days.

(21) Appl. No.: 10/965,560

(22) Filed: Oct. 14, 2004

(65) Prior Publication Data

US 2006/0085207 A1    Apr. 20, 2006

(51) Int. Cl.
*G06Q 10/00* (2012.01)
(52) U.S. Cl. ..................................................... 705/306
(58) Field of Classification Search ............... 705/4, 306
See application file for complete search history.

(56) References Cited

U.S. PATENT DOCUMENTS

| | | | | |
|---|---|---|---|---|
| 5,717,865 | A * | 2/1998 | Stratmann ....................... | 705/10 |
| 5,857,174 | A * | 1/1999 | Dugan ............................ | 705/313 |
| 2002/0002494 | A1 * | 1/2002 | Beam et al. .................... | 705/20 |
| 2003/0023462 | A1 * | 1/2003 | Heilizer ........................ | 705/4 |
| 2003/0149658 | A1 * | 8/2003 | Rossbach et al. ............ | 705/38 |
| 2004/0019517 | A1 * | 1/2004 | Sennott ......................... | 705/10 |
| 2004/0049440 | A1 * | 3/2004 | Shinoda et al. ............... | 705/35 |
| 2004/0254803 | A1 * | 12/2004 | Myr ................................ | 705/1 |
| 2005/0159968 | A1 * | 7/2005 | Cozzolino ...................... | 705/1 |
| 2005/0288942 | A1 * | 12/2005 | Graboske et al. .............. | 705/1 |

OTHER PUBLICATIONS

Taylor, Gary P., and Wright, Margo T., "Tomorrow's Appraiser: AQB Sets a Higher Standard," The Appraisal Journal, Oct. 2003, pp. 356-359.*
Calhoun, Charles A., "Property Valuation Methods and Data in the United States," Housing Finance International, Chicago, Dec. 2001, p. 12.*
PR Newswire, "First American Real Estate Solutions Launches RealQuest(R).com for Lenders and Appraisers," New York, Jan. 23, 2002, p. 1.*
PR Newswire, "First American Real Estate Solutions Reaches 2,000 County Milestone in Property Data Coverage," New York, Jul. 22, 2003, p. 1.*
Ross, David M., and Nattagh, Nima, "The Future of Automated Appraisals," Mortgage Banking, Aug. 1996, pp. 59-62.*

* cited by examiner

*Primary Examiner* — Nathan Erb
(74) *Attorney, Agent, or Firm* — D. Peter Hochberg; Sean F. Mellino; Daniel J. Smola

(57) ABSTRACT

A system and method that allows an appraiser, real estate broker or other professional, based on preliminary information about a requested appraisal, to use any of a plurality of automated valuation products to effectively calculate an appraisal value. In one embodiment, a lender places an order electronically with or through an appraisal management vendor or other entity, which transmits the order in the form of an assignment to an appraiser appropriately licensed and trained for that assignment. The appraiser will preferably, through e-mail, web site or other means, receive the order and will have the ability to access one or a variety of automated models, such as AVM models. Based on the appraiser's own knowledge and the automated results, the appraiser may arrive at a valuation that combines the relatively low cost and rapid turnaround time of an AVM with the expertise and accuracy of a skilled appraiser.

2 Claims, 2 Drawing Sheets

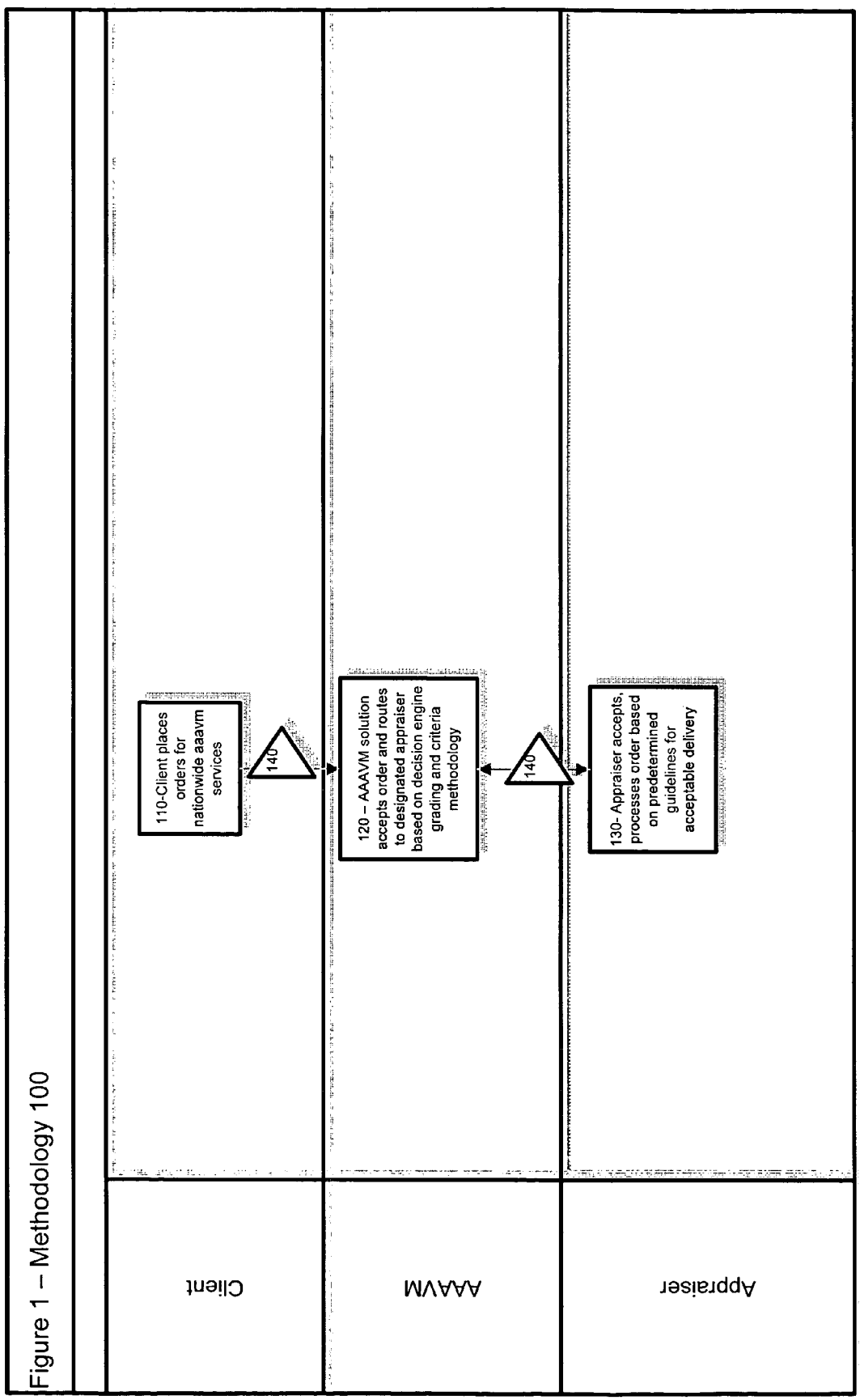

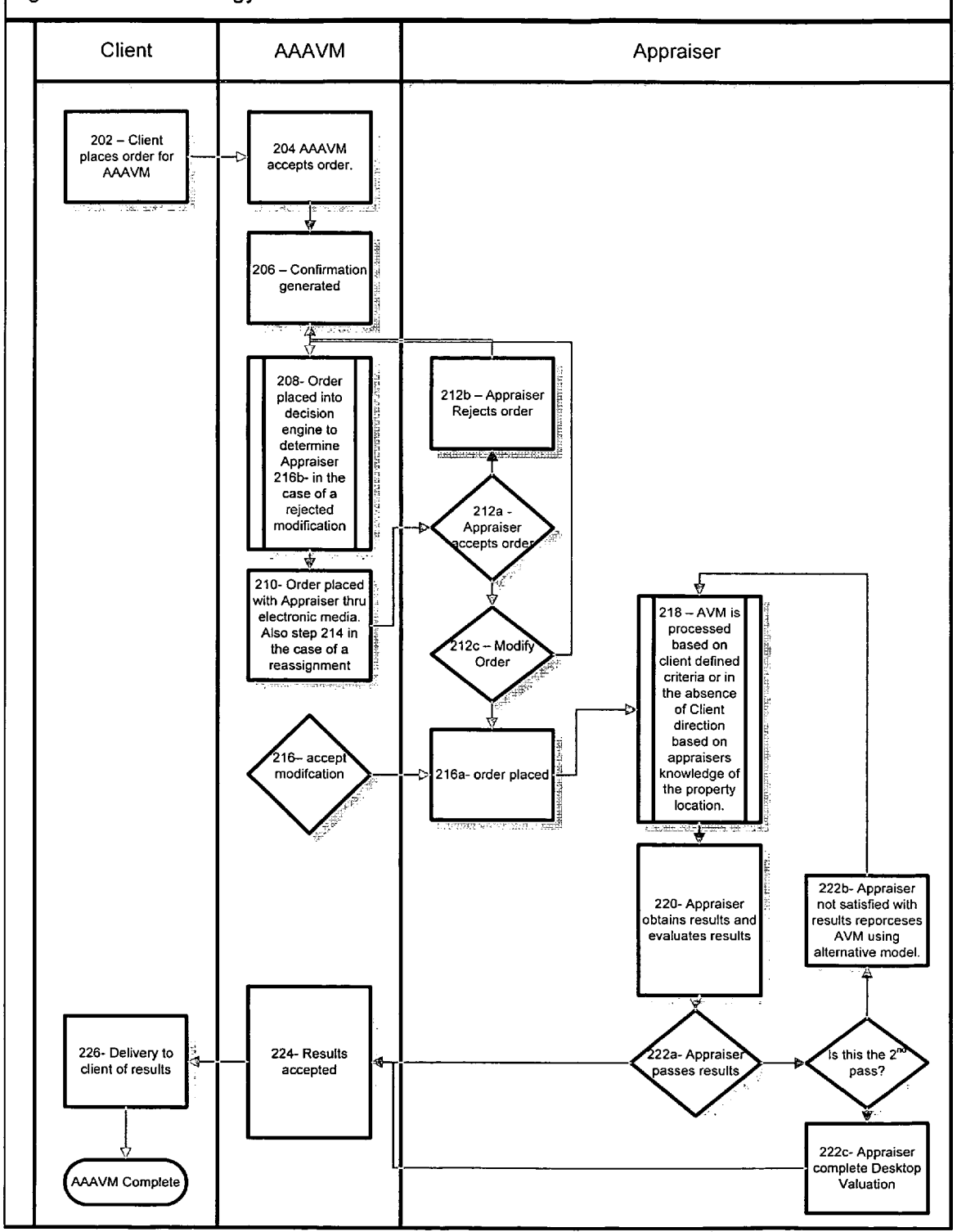

SYSTEM AND METHOD FOR APPRAISER-ASSISTED VALUATION

BACKGROUND OF THE INVENTION

1. Field of the Invention

The invention relates generally to valuation or appraisals of property. More specifically, the invention relates to a system and method for automated, appraiser-assisted valuation of real estate.

2. Description of the Prior Art

The mortgage lending industry makes loans to individuals based on several criteria including a valuation of the "subject property." One of the principal steps in the decision of whether to make a loan and its appropriate amount (the "underwriting" of the loan) is the valuation of the subject property that will secure a promissory note and mortgage. In general, the value of the subject property that secures the lender's interest must equal or exceed the purchase price to which the buyer/borrower and seller agree in the contract of sale. As such, the real estate valuation is often a critical step in the mortgage lending process.

The typical valuation method is an "appraisal" of the subject property, performed by an appraiser who is certified or licensed within his or her state and/or locality. Appraisers are normally certified or licensed according to various state and federal laws, rules and regulations. Appraisers are generally qualified to do business as an appraiser under rules and regulations not only of the state or locality but also under the auspices of various certifying entities on a national or regional basis.

Appraisals today are typically of one of two types. The first is a "full" appraisal of the property. The second is a "drive-by" appraisal.

The "full" appraisal process, in general, is as follows. Within a few days of the loan application, a mortgage lender orders an appraisal of the property securing the mortgage. The lender orders this appraisal either directly from an appraiser, a corporate-owned internal management company, an external vendor management company, or through an "appraisal management company," which then orders the appraisal from a residential real estate appraiser. The appraiser accepts the assignment and makes an appointment to inspect the interior and exterior of the property with its owners or their real estate agents. The appraiser's inspection of the property usually occurs between two and four days after the appraisal order is placed. The appraiser conducts a physical inspection of the interior and exterior of the property, notes any unusual or notable characteristics and measures each room (or at least the foundation dimensions) to arrive at the approximate square footage. The appraiser normally takes photographs of the exterior and, often, the interior of the subject property. Next, the appraiser evaluates the data and selects a number of comparable homes nearby to the subject property and takes photos of these. The entire inspection and picture-taking process can take from a few hours up to a full day.

The appraiser returns to his or her office and completes a side-by-side comparison of the subject property with those properties considered comparable that have sold and others that are on the market. In practice, the appraiser must often review up to a dozen comparable properties in order to select those that form an appropriate basis for comparison. Using an appraisal form that is satisfactory to the lender (commonly known as the Uniform Residential Appraisal report), the appraiser performs a thorough comparison of all the properties and completes a written report detailing factors including, but not limited to, size in square feet, condition, the existence of a garage, lot size, style, age, finish of interior, kitchen, bath, landscaping and others.

The appraiser uses the sales prices of comparable properties that have sold to establish a value for the subject property. The appraiser may also consider the existence of comparable properties that are presently on the market and the prices at which they are listed for sale. Finally, the appraiser considers the period of time that has elapsed between the sale of the comparable properties and the current date in adjusting the comparables' sales prices to that of the subject property.

This analysis is generally contained on an 8×14 inch double-sided document with approximately 114 different fields for data. Comments about the subject property and market are added where the appraiser considers these to be pertinent. The appraiser then signs the appraisal form and indicates a value for the subject property. The appraisal document must be produced in a form that complies with the underwriting guidelines of the lender or correspondent making the mortgage.

As many loans are sold from their primary lender to investors that aggregate and often scrutinize loans ("the secondary mortgage market"), the appraisal forms and methodology used normally must further comply with the requirements of the secondary mortgage market.

A "drive-by" appraisal, generally, is performed in a similar fashion to the "full" appraisal except that the appraiser does not conduct an interior inspection of the subject property. The drive-by appraisal is utilized in a variety of situations, such as where the credit or other risks attendant to the borrower of the type of loan are less, and thus the need for accuracy in the valuation process is deemed less. These situations and methodology are likewise dictated by and under guidelines set both by the secondary market and by individual lenders. In general, a drive-by appraisal takes significantly less time to complete (as the appraiser does not need to schedule an interior inspection of the subject property) and costs considerably less.

Generally, appraisers do not have either pictures or firsthand information on the interior of the property unless they take the time to physically inspect the interior. This fact often causes drive-by appraisals to be less accurate.

Currently, a full appraisal may generally cost from $250.00 to over $400.00, where such cost is nearly always passed on to the consumer by the lender. A drive-by appraisal currently may generally cost between $175.00 and $250.00. The elapsed time from placement of the order for a full appraisal to the lender's receipt of the finished document is generally 7-10 days. The elapsed time for a drive-by appraisal is generally 2-5 days.

Placement of the order from the lender to either the appraisal management company and/or the appraiser takes place by numerous methods including telephonic order, fax, e-mail, XML data feed or use of a web site. The method of communication of the finished appraisal to the lender by the appraiser is done either on a printed form (with attachment of photographs) or through an electronic form which is disseminated by e-mail or web site.

Over the past few years, methods have been introduced to value residential property in a fashion that is quicker and less expensive. All of these methods utilize publicly and privately available databases of the sales prices that have been obtained for prior sales of real estate. These methods; while somewhat different, each use a computer-generated model to match a subject property to several apparently comparable properties using only a "data match" comparison model (commonly known as the "automated valuation model" or "AVM"). The purpose of such database methods is to replace the use of the local appraiser with a database match method for generating a computer-produced value. This method provides for a rapid turnaround at a relatively low cost, currently $20.00-$40.00 per valuation. In terms of accuracy, however, computer driven valuations have thus far proven to be unreliable. In surveys of the lending industry, it has been demonstrated that as often as half of the time the AVM is more than 20% greater or less than the actual sales price of the subject property. The reasons for this are at least threefold:

(1) The model does not sufficiently recognize and adjust for local market characteristics;

(2) The variation in home values in a specified geographic area is too wide to be handled by the model's parameters (i.e., the existence of very expensive homes near moderately priced homes); and (3) The model has too little data on the relevant market for automated adjustments to be statistically valid.

Further, one of the challenges for a typical AVM is the lack of attention to the nuances of the local real estate market. As an example, not every housing development is priced the same, or even within the same range from relevant market to relevant market. In addition, in older communities where homes may have historical value or have additional value due to a characteristic peculiar to that area, for example, a database model tends to less accurately reflect the true market value.

Due to accuracy issues, lenders have put model assigned valuations to only limited use. The result is that lenders are challenged to select between a full appraisal, drive-by appraisal or an automated valuation model. This creates a complex decision process requiring the lender to match the valuation method to the type of property, geographic area, and dictates of the secondary market. Further, projecting the costs of the type of valuation, in part to complete the required Good Faith Estimate, which is part of the lending process, is difficult. The lender must also contend with varying forms of ordering and receipt of valuation documents.

What is needed is a system by which a lender, or other party desiring a valuation, can obtain one quickly, cheaply and accurately, preferably by electronic means such as the Internet and associated systems.

SUMMARY OF THE INVENTION

The present invention preferably allows an appraiser, real estate broker or other professional (collectively referred to herein as an appraiser or appraisers), based on preliminary information about a requested appraisal, to use any of a plurality of automated valuation products to effectively calculate an appraisal value. In one embodiment, a lender places an order electronically with or through an appraisal management vendor or other entity, which transmits the order in the form of an assignment to an appraiser appropriately licensed and trained for that assignment. The appraiser will preferably, through e-mail, web site or other means, receive the order and will have the ability to access one or a variety of automated models, such as AVM models. The appraiser, with knowledge of the type of assignment and the local market, will then preferably choose, or have chosen for him or her by the client or appraisal management supplier—due to internal testing of models, the appropriate AVM model for utilization.

This invention also preferably allows an appraiser to review results of the AVM evaluation to determine whether those results are accurate, and whether and to what extent further evaluation methods (such as a drive-by or full appraisal) should be utilized. The appraiser may also make adjustments in the value produced by the AVM depending upon his or her knowledge of or information about the market and the subject property. For example, the appraiser may possess pictures and/or other data sources, or may have the same delivered to him or her through the invention. Based on this knowledge and/or information, the appraiser may modify the AVM value returned, and/or add or subtract property information or values or other information to or from the information used by the AVM algorithms. In one embodiment, various types of software are provided to assist in the adjustment process.

Preferably, at any point in the valuation process, the appraiser may assign a confidence factor or score for the valuation result reached and/or for the property itself. The factor may be used by a lender or other interested party to determine the reliability of the valuation, for example. Preferably, the appraiser may further utilize information obtained through the AVM, or collateral information obtained through the processes described above, to give a collateral score to the property. This score may define either or both the reliability of the valuation or the prospects for future appreciation or depreciation in the value of the property being analyzed, among other things.

The invention may also use a computer automated and/or web site assisted method. For example, a web site may provide an avenue for a lender or supplier to order a valuation as described herein or to apply standards and/or criteria developed by that lender or others to order the appropriate valuation method for a specific assignment. Preferably, a lender or other interested party may select a valuation method from such possibilities as full appraisals, drive-by appraisals, brokers' price options, AVMs or other alternative valuation techniques and others. The present invention preferably allows an appraiser to, among other things, (I) receive an order, (II) process the order (by selecting and utilizing the appropriate AVM model), (III) modify information considered by the AVM, (IV) review the result of that model, (V) modify that result or (VI) select an alternative valuation methodology and (VII) communicate those results electronically (by XML data feed, computer-to-computer, e-mail and/or web site) to an appraisal management company, vendor management company and/or lender or lenders.

BRIEF DESCRIPTION OF THE DRAWINGS

The present invention is described with reference to the accompanying drawings:

FIG. 1 is an embodiment of a system of the present invention; and

FIG. 2 is a flow chart illustrating an embodiment of a method of the present invention.

DETAILED DESCRIPTION OF THE PREFERRED EMBODIMENTS

The present invention preferably provides a means to arrive at a valuation that combines the relatively low cost and rapid turnaround time of an automated valuation with the expertise and accuracy of a skilled appraiser. In one embodiment, the invention is implemented by an entity that provides lending and/or relocation appraisal services, such as an appraisal management company. Referring to FIG. 1, a system 100 is illustrated that may be used in implementing the invention in this embodiment. The system 100 includes a client location 110, a server location 120 and an appraiser location 130, each coupled in communication with each of the others by a network (or portal, wireless, broadband and communication or satellite device) 140.

The network 140 may be an appropriate interface, public or private. The invention may be practiced over the Internet, for example, and may therefore utilize hardwired and/or wireless portions thereof as desired. Alternatively, the invention may be practiced on an internal local or wide area network (LAN or WAN, respectively), or over a telephone or other network that may or may not be part of the Internet. Other variations will be readily apparent to one skilled in the art.

Depending on a network used, the client location 110, of which there may be one or more, may be any location in communication therewith. For example, if the Internet is used, the client location 110 may include any device having appropriate web browser capability, such as a personal computer, personal digital assistant (PDA), mobile phone, etc. Of course, in an embodiment where appraisal requests need not be receivable from a remote location, the client location may be optionally omitted. That is, the invention may be used to generate appraisals internal to an independent entity, for example, rather than to provide appraisals to third party requestors. If the Internet is not used, the client location 110 may be any location capable of communication with the server location, and thus not even include any electronic device.

The server location 120 may include any device capable of receiving an appraisal request from the client location 110. The server location 120 may also include web server functionality, data storage, etc., such as for supporting a web site of an appraisal management company or other interested entity. The server location 120 may alternatively further include a device for providing AVM or related functionality, e.g., functionality for providing an automated valuation. Alternatively, such functionality may be provided from a location remote to the server location 120. Preferably, the valuation provided is of a type described above, wherein value is determined based on comparable prior values, such as from prior property sales in the same or other localities and/or current listings, and other related data. Other valuation means may be used as well.

The appraiser location 130 illustrated is preferably one of a plurality of web-enabled locations for interfacing with an appraiser. However, each appraiser location 130 need not be supported by an independent entity at a remote location, but may instead be incorporated into the server location 120. For example, the appraisers may be a part of the appraisal management company or other related entity supporting the server location 120, or an entirely unrelated entity.

Using the present invention, a lender or other interested party is preferably able to obtain accurate real estate property valuations quickly and at a consistently low, budgetable cost. Thus, the invention may allow lenders to enhance their competitive positions in the marketplace by delivering rapid loan approvals at a level of accuracy that produces loans that meet the requirements of the secondary mortgage market. The invention may also be used to provide appraisals that, in general, comply with the Uniform Standards of Professional Appraisal Practice (USPAP), a set of standards developed by a national professional appraisal oversight group. Generally, lenders are required to deliver into the secondary market loans that meet specific underwriting guidelines. For example, a valuation of property, e.g. an appraisal, may be required to be at least as much as the sale price of the property.

There are several markets that may be receptive to the appraisals reached in accordance with the present invention. These include, but are not limited to:

Purchase Money Mortgages Refinances
Home Equity Loans
Loan Quality Control (testing a % of a loan portfolio)
Mortgage Secondary Market
Private Mortgage Insurance Releases An embodiment of a method of the present invention will now be described with reference to FIG. 2. In this embodiment, the present invention may, as an example, be practiced by an entity that provides valuations, and utilized by a client that wishes to request a valuation. For example, the method 200 may begin when, in step 202, the client, who may be a lender such as a mortgage company, a property owner or any other interested party or entity, accesses the system 100 of the invention. Preferably, the client accesses the system via a client location 110. In one embodiment, the client accesses the system 100 by connecting to a web site developed to receive and process appraisal requests (the "appraisal web site").

The client may then be presented with a home page, some type of appraisal request form to be completed, or any other indicator that the client may submit an appraisal or valuation request. Alternatively, no initial indicator need be required, such as where the client initiates the process using e-mail, a PDA, cell phone, etc., to submit the request. As will be appreciated by one skilled in the art, the client may, if desired, be required to log in by providing certain identifying information, or otherwise authenticate his or her request.

Regardless of the means, the client then preferably provides all necessary data and submits the request. If the Internet is used, the request may be submitted to the appraisal web site, such as at the server portion 120 of the system 100, for example. As illustrated in FIG. 2, the request from the client is received in step 204. Alternatively, software at the client location or at the web site may use existing data to complete or compile a portion of or the entire request, such as in an order form. Furthermore, either upon connection or previously, software or other means may also be provided, if desired, for using certain information, such as credit score, loan-to-value ratio, demands of secondary market buyers of the loan and/or other relevant information, to determine the appropriate valuation product for a specific valuation. In one embodiment, the request may include at this step, or alternatively as an earlier preliminary step, an indication of an assignment parameter that may be compared to valuation products previously used by the requesting client. Various valuation products are further discussed below.

In step 206, a confirmation may be generated, if desired, and sent to the client. Like the original request, such a confirmation, which preferably indicates that the order has been received and/or other information, may be delivered via e-mail by the appraisal web site or by any other means. The appraisal web site's processor then preferably searches its system or beyond for an appropriate appraiser, as shown by step 208. Selection of an appraiser may be based on any of a variety of factors, such as accuracy, speed, customer satisfaction, cost, coverage, availability, existing volume of open orders and others. These and/or other factors may be applied generally, or may vary from one client or appraiser to the next. Often, the selected appraiser will be local to the property to be appraised, as a local appraiser may be more likely to be familiar with property values in any given area. However, any appraiser may be chosen. Once the system selects an appraiser, the system preferably assigns the order electronically and sends the assignment to the designated appraiser in step 210.

In one embodiment, this assignment occurs automatically and electronically, such as by e-mail or web page. Such an e-mail or web page may contain all necessary information about the appraisal request. Alternatively, some information may be provided, as well as an Internet hyperlink linking the appraiser to the server location 120. When an order is transmitted electronically, the system preferably automatically populates all of the fields of the order using a tracking and billing system. It should be noted that each of the steps described subsequent to manual placement of the original request may, if desired, be fully automated by system 100 of the present invention. That is, no manual intervention is required once the client has entered the order into the appraisal web site.

Once the appraiser receives the order by e-mail or other chosen means, the appraiser preferably decides whether or not to accept the order. If the order is sent by e-mail, web page, etc., the appraiser may take further action to learn more information, such as by clicking on a hyperlink within an e-mail, before making such a decision. If the appraiser is able to perform the appraisal, he or she may click on an "accept order" or similar link, or take other action to indicate acceptance. Such acceptance is received in step 212a. The appraiser may also decline, in which case the appraisal web site is preferably notified, as shown in step 212b, and a new search and reassignment of the order undertaken, as shown in step 214. This may merely lead to modified repetition of step 210 (e.g., modified such that the same appraiser is not selected and/or other changes) or other steps.

As another alternative, the appraiser may modify the request, as shown in step 212c. The system may either reject or accept the modification as indicated by steps 216a and 216b, respectively. If rejected, an appraiser may be reassigned, for example, such as by repeating step 208. If accepted, the appraiser may be notified of such. The client or supplier is preferably also notified, and may track any or all steps of the assignment and generate reports or change assignments as required through the methods of the invention.

Following acceptance of the order by an appraiser, the appraiser, in one embodiment, is given the ability to access any of several AVM or comparable alternative products. Alternatively, the appropriate AVM may be pre-selected by the client or other individual. A selection of such products may be provided via the appraisal web site (e.g. the server portion 120 or some other location) in step 218, or may be retrievable elsewhere. Preferably, the appraiser selects the valuation product determined to be the most appropriate for a particular valuation. Given the local appraiser's knowledge of the area, he or she will often be in the best position to determine the appropriate AVM model to run on the subject property. If the valuation products are provided from the server portion 120, the appraisal web site receives the selection of one of them in step 220. Of course, more than one automated appraisal may be run if desired.

In one embodiment, the system may also communicate, to the appraiser and/or supplier, pictures and/or other collateral information on either the property being valued or on comparable properties sold or on the market. Such information may come from any outside source including the lender, supplier or other real estate professionals or other sources of information or databases, and may be utilized in the appraiser's analysis.

In step 222a, the system preferably receives the property information entered by the appraiser and the chosen AVM model is run. Alternatively, the property and related information may be populated into the system automatically. The AVM is generated and, if enough information is present to determine a reasonably reliable valuation, an output is returned in step 224.

If the appraiser is unsatisfied with the results, the appraiser may elect to modify or supplement the entered information. For example, the appraiser may be able to access the list of properties and/or other information the AVM is using in its evaluation and delete, add or otherwise modify the information used. Such other information may come from connections to databases or other sources of information, pictures, etc. In this case, the modified information may alternatively be received in step 222b and the analysis run again, such as by repeating step 222a or by running a different valuation. Alternatively, the appraiser may choose to proceed to what is termed a Desktop Valuation, as described below. In this case, a predefined Desktop Valuation form may be transmitted to the appraiser in step 222c if desired. Alternatively, the relevant information may be received and compiled to any format by the system. The Desktop Valuation option may also be preferred if not enough information is presented in the system to perform an automated analysis.

However, where an analysis is feasible, the results provided by running the appropriate AVM model, which may be displayed on the local appraiser's computer or other output device, may include such information as a description or other identifier of the subject property, a list of comparable properties and their dates of sale, and the estimated value of subject property, among other data. If the appraiser is satisfied with the results, he or she may accept them and submit them as is. Thus, the system may receive the accepted results in step 224. The appraiser may alternatively combine them with the appraiser's specialized knowledge of the relevant area and/or current conditions or other factors to reach a modified final value, alternatively received in step 224. Thus, to summarize, the local appraiser preferably reviews the data, applies his knowledge of the local market to the comparables and, as discussed above, makes a decision, which may be one of the following or a variation thereof, or others:

(a) The local appraiser rejects the results given by the chosen AVM model and chooses and runs another AVM model; or (b) The local appraiser accepts the AVM results; or (c) The local appraiser accepts the AVM model and modifies the results based on local conditions known to the local appraiser; or (d) The local appraiser modifies the property information used within the AVM by adding or subtracting property information known personally; or (e) The local appraiser completes a Desktop Valuation using his/her own, more relevant data on the local market.

Of course, other options are contemplated as well. For example, in some instances, the appraiser may recommend an upgrade to a drive-by or full appraisal. Preferably, only an experienced local appraiser is given discretion to make such a judgment.

In situations where a "Desktop Valuation" is opted for, an appraisal is completed without an inspection of the subject property or comparable properties. The value of the property may be determined using the appraiser's own files as well as data from public or private records and property databases. The appraiser may also employ a Sales Comparison Analysis to derive his or her conclusion of value. The results of such an appraisal are received in step 224.

Regardless of the means of reaching a final appraised value, the appraisal web site may be used to access the form necessary to complete the valuation process. Preferably the appraiser enters the information required and submits it to the appraisal web site. Certain requirements may be placed on this submission if desired. For example, the appraiser may be required to enter a password and/or to provide an electronic signature or other indication of authentication. The system may also require that the information be transmitted by secure means, such as https (secure hypertext transfer protocol).

The result may be reviewed on screen and forwarded to the client location 110 or any other designated location, preferably in electronic format, as shown by step 226. Alternatively, the result may be available only in hardcopy, for example. Preferably, the elapsed time from appraisal order to delivery is as little as two hours or less, but is preferably no more than 24 hours.

In one embodiment, an appraiser may at any time publish either a confidence score or collateral value score which reflects the appraiser's opinion regarding the reliability of the result produced or the likelihood of property appreciation or depreciation in the future. This information may be entered on the appraiser's system and communicated together with or apart from the valuation described above. Depending on a confidence score, a client may elect to upgrade to a different valuation type, for example.

For purposes of illustration only, and not limitation, the following chart provides a side-by-side comparison of cost, turnaround time and accuracy for various embodiments of a full appraisal, drive-by appraisal, automated appraisal, and appraiser-assisted appraisal in accordance with an embodiment of the present invention.

| Cost and Delivery Comparison | | | |
| --- | --- | --- | --- |
| | Cost | Turnaround | Accuracy |
| URAR (full appraisal | $250-$400 | 5-10 days | 1 |
| Drive-by Appraisal | $175-$250 | 3-5 days | 2 |
| AVM | $5-$30 | Same day | 3-5 |
| Appraiser-Assisted | $90-$100 | 24 hours or less | 2-3 |

Note:
Accuracy ranks each product according to relative accuracy of the appraised value on a scale of 1-5, with "1" being the most accurate.

The present invention, when used to support loans destined for sale in the secondary mortgage market, might be used to generate an entire new category for pricing loans in securitization activities. Securities and instruments secured by residential loans often require an appraisal on each individual loan making up a mortgage security. The relative accuracy of this invention preferably leads to more favorable pricing than loans secured by, for example, standard AVMs.

Therefore, in one or various embodiments, the present invention may achieve some or all of the following features, among others:

Order and receipt of all items electronically
Appropriate ordering of the correct valuation method for an assignment
Web-based access to computer models, forms, pictures, data, etc., using software
Accurate property valuation in less time than traditional methods
Delivery via electronic means; ergo, a paperless process in a traditionally paper-intensive industry
Cost effective valuation services at a competitive price
A new method and product to lenders and to the secondary mortgage loan market
A means for determining the reliability of an alternative valuation method as well as the likelihood of future appreciation or depreciation of the subject property While various embodiments of the invention have been described, it will be apparent to one skilled in the art that many more embodiments and implementations are possible that are within the scope of the invention. For example, methods of the invention are not limited to transactions between any particular parties. Nor are the methods limited to steps described or illustrated by the figures. To the contrary, methods of the invention may include additional steps, and need not include all steps shown. Likewise, implementation, electronic or otherwise, is not limited to any particular software or other means, such as the Internet or other networks. Accordingly, the invention is not to be restricted except in light of the attached claims and their equivalents.

What is claimed is:

1. A method for appraiser-assisted valuation of a subject property for a requester, wherein the appraiser obtains inputs in electronic form on an electronic work station, said method comprising:

completing an electronic valuation request form including providing data upon which the valuation is to be based, in a requester electronic work station;

sending the electronic valuation form electronically to an electronic work station of professional appraisers in the general vicinity of the subject property from an electronic database identifying respective professional appraisers in the general vicinity of the subject property, the professional appraisers having been licensed and trained to appraise electronically real estate properties, wherein "general vicinity of the subject property" means within a defined area surrounding the subject property;

determining, by a computer system, that the first set of options that are available to be provided to the professional appraiser are: (1) accepting the valuation request form and becoming a selected appraiser, (2) modifying and accepting the valuation request form and becoming a selected appraiser, and (3) rejecting the valuation request form to effect the sending of the valuation request form to another professional appraiser for acceptance or rejection; wherein the first set of options are distinct and separate from each other;

providing, by the computer system, the professional appraiser with the first set of options of: (1) accepting the valuation request form and becoming a selected appraiser, (2) modifying and accepting the valuation request form and becoming a selected appraiser, and (3) rejecting the valuation request form to effect the sending of the valuation request form to another professional appraiser for acceptance or rejection; wherein the provided first set of options are distinct and separate from each other;

accepting the appraiser to conduct the appraiser-assisted valuation;

providing, by the computer system, to the selected professional appraiser an initial automated valuation from a computer generated model based on valuation from properties comparable to the subject property;

determining, by the computer system, that the second set of options that are available to be provided to the professional appraiser are: (1) accepting the result of the initial automated valuation, (2) rejecting the initial automated valuation and processing a different automated valuation to determine an acceptable automated valuation, (3) accepting the initial automated valuation and modifying the resulting valuation based on local conditions in the area of the subject property, (4) modifying the property information used to develop the initial automated valuation by adding or subtracting property information used for the initial automated valuation to generate its valuation, and (5) completing a Desktop Valuation based on local market data; wherein the second set of options are distinct and separate from each other;

providing, by the computer system, all of the following second set of options to the selected professional appraiser to determine the appraisal value:

accepting the result of the initial automated valuation;

rejecting the initial automated valuation and processing a different automated valuation to determine an acceptable automated valuation;

accepting the initial automated valuation and modifying the resulting valuation based on local conditions in the area of the subject property;

modifying the property information used to develop the initial automated valuation by adding or subtracting property information used for the initial automated valuation to generate its valuation; and completing a Desktop Valuation based on local market data;

wherein the provided second set of options are distinct and separate from each other;

accepting a selected one of the provided second set of options;

determining the final valuation based on the selected one of the provided second set of options;

completing the appraiser form and submitting the form electronically to the appraisal website; and transmitting the appraiser assisted automatic valuation electronically to the requester electronic work station.

2. The method of claim 1, wherein the step of determining the valuation based on the automated valuation is provided at a location remote to the professional appraiser.

* * * * *